Sept. 6, 1932.  E. F. HUDDLE  1,876,006
MOWER
Filed Oct. 9, 1931
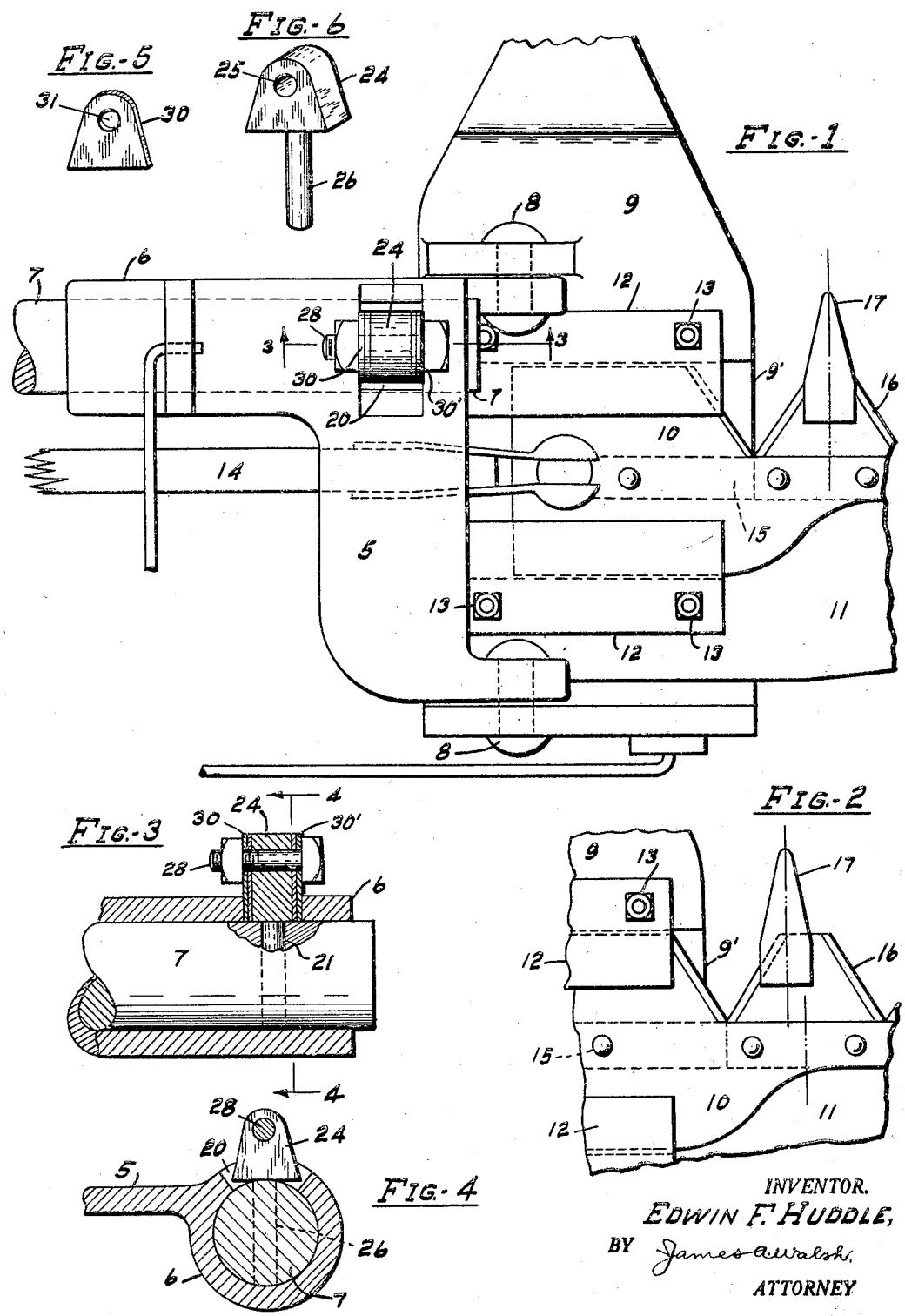
INVENTOR.
EDWIN F. HUDDLE,
BY James A. Walsh,
ATTORNEY Patented Sept. 6, 1932

1,876,006

UNITED STATES PATENT OFFICE

EDWIN F. HUDDLE, OF ROCKFORD, ILLINOIS, ASSIGNOR TO J. I. CASE COMPANY, OF RACINE, WISCONSIN, A CORPORATION

MOWER

Application filed October 9, 1931. Serial No. 567,847.

In the final assemblage of mowers it is essential that the sickle-bar shall be so adjusted in relation to the finger-guards through which its knives reciprocate as to be properly aligned therewith, but as commonly practiced with the various means at present in use, so far as I am aware, when making such adjustments it becomes necessary to remove and then replace other parts of the mower, with considerable difficulty and loss of time; and it is my object, therefore, to provide simple means adapted to be readily manipulated for making such adjustments quickly and accurately without disturbing any of the various elements of the mower, and to obviate the disadvantages referred to.

In the accompanying drawing, forming part hereof, Figure 1 is a fragmentary plan view of that portion of a mower with which my improvement is employed, the cutting mechanism being indicated as in proper adjustment; Fig. 2, a detail plan view indicating the cutting mechanisms out of alignment; Fig. 3, a detail section taken on the dotted line 3—3 in Fig. 1; Fig. 4, a detail section on the line 4—4 in Fig. 3; and Figs. 5 and 6 are perspective views, respectively, of a shim and a stop forming parts of my improvement.

In said drawing the numeral 5 indicates a shoe support embodying a sleeve 6 in which a shaft 7 is mounted, in a well know manner, said support being hingedly connected, at 8, to a shoe 9 of any desired construction and arrangement, which shoe with a sickle-head 10, cutter-bar 11 and pitman guides 12 are secured by bolts 13, as is common, so that said parts 9, 10, 11 and 12 constitute a unitary structure pivotally mounted on the shoe support to be swung vertically for purposes well known. As usual, a pitman 14 connected to the sickle-head 10 reciprocates the sickle-bar 15 carrying the knives 16 which cooperate with finger-guards 17 to cut crops, and as said parts with those illustrated in Fig. 1 may be of well known construction and arrangement it will be unnecessary to describe them specifically.

My improvement consists in the use of a sleeve, as 6, having an opening 20 therein, as clearly indicated in Fig. 4, registering with an opening 21 through shaft 7, into which latter opening a stop is driven comprising a head 24 having an opening 25 therethrough, and a pin or shank 26 by which the shaft and stop are locked against moving, while the sleeve may move longitudinally on the shaft.

In Fig. 1 the parts of the mower are indicated as in normal adjusted relation after the mover has been assembled, in which view it will be seen that I employ a bolt 28 parallel with the sleeve 6 and the passing through the head 24 and through shims 30, 30', at each side of the head, the shims being apertured, at 31, for the purpose, and preferably are of the shape of the ends of the head 24, and which shims and head take up any misadjustment which might exist between the sickle-bar and finger-guards to cause said elements to be out of alignment. In normal position the relation of the finger-guard 17 and one of the cutting knives 16 is indicated by the dotted line passing centrally through said parts, but when not properly adjusted the knives may be positioned out of line with the finger-guards either at one side or the other thereof, substantially as indicated by the center lines in Fig. 2, upon which occurrence the adjustment may be readily corrected by transferring one or both shims 30 from the lefthand side of the head, as seen when looking at Fig. 1, to the opposite side, and, as the case may be, driving one or both home, when the head and shims thus assembled may be secured by the bolt 28 as shown. By thus driving the transferred shims between the shims 30' and the sleeve 6 it will be seen that the shoe support, the shoe through its hinged connection and pitman guides and cutter-bar, as a unit, will be forced laterally along the sickle-head until the outer edge 9' of the shoe occupies the position shown in Fig. 1, that the center lines of the finger-guards and knives will coincide, and the adjustment of the parts thus accurately performed. It will be understood, of course, that if adjustment of the knives is desired in the reverse direction the shim or shims 30' on the right-hand side of the head 24 may be transferred to the opposite side when the shoe support 5 and parts connected thereto will be drawn inwardly to the desired position and the shims and head again secured by the bolt in the manner before described. By my improvement simple means are provided for readily and positively aligning the sickle-bar and its knives in relation to the finger-guards and that as the take-up means are in exposed position ready access thereto is permitted without the removal and replacement of other parts of the mower which, as stated, is necessary in common practice and therefore objectionable.

I claim as my invention:

1. In a mower having a shoe support, a shaft upon which said support is mounted, a shoe connected to the support, reciprocating cutting devices mounted upon the shoe, means for actuating the devices, means for adjusting the support in relation to the cutting devices comprising a stop insertable through the support and into the shaft said stop having shims at its sides, and means for detachably securing the stop and shims together.

2. In a mower having a shoe support, a shaft upon which said support is mounted adjustably in longitudinal relation to the shaft, a shoe connected to the support, a sickle-bar slidably mounted on the shoe, means for reciprocating said bar, means for securing the support and shaft together, and means associated with the securing means for urging the support longitudinally on the shaft to adjust the sickle-bar.

3. In a mower having a shoe support, a shaft upon which said support is adjustably mounted, a shoe connected to the support, a sickle-bar slidably mounted on the shoe, means for reciprocating the bar, means for adjusting the support on the shaft including a head having a pin extending therefrom adapted to be inserted in the support and shaft and wedging means insertable alongside the head, and means for maintaining the head and wedging means in assembled relation.

4. In a mower including a shoe supporting sleeve having an aperture in its wall, a shaft upon which the support is mounted and having an aperture therein registering with the sleeve aperture, means insertable in the apertures for securing the shaft and sleeve in non-rotatable relation, and means adapted to be positioned between the insertable means and the sleeve for adjusting the latter longitudinally on the shaft.

5. In a mower including a shoe supporting sleeve having an aperture in its wall, a shaft upon which the support is mounted and having an aperture registering with the sleeve aperture, and means insertable in the apertures for securing the shaft and sleeve in non-rotatable relation and also for limiting the longitudinal movement of the sleeve on the shaft when said sleeve is adjusted thereon.

In testimony whereof I affix my signature.
EDWIN F. HUDDLE.